United States Patent [19]

Schramer et al.

[11] 4,223,054
[45] Sep. 16, 1980

[54] DIMENSIONALLY STABLE, CALENDERED VINYL FILM

[75] Inventors: Kurt M. Schramer; Don O. Ocampo, both of Newburgh, N.Y.

[73] Assignee: Stauffer Chemical Company, Westport, Conn.

[21] Appl. No.: 961,427

[22] Filed: Nov. 16, 1978

Related U.S. Application Data

[60] Continuation of Ser. No. 796,275, May 12, 1977, abandoned, which is a division of Ser. No. 667,223, Mar. 15, 1976, Pat. No. 4,124,431.

[51] Int. Cl.² ............................................. B32B 27/10
[52] U.S. Cl. ..................................... 428/40; 428/518; 428/522; 428/31
[58] Field of Search ......................... 428/40, 518, 522

[56] References Cited

U.S. PATENT DOCUMENTS

| | | | |
|---|---|---|---|
| 2,451,597 | 10/1948 | Wheeler | 156/322 |
| 3,074,114 | 1/1963 | Petry | 264/346 |
| 3,532,652 | 10/1970 | Zang et al. | 156/230 |
| 3,623,944 | 11/1971 | Davis | 156/246 |

*Primary Examiner*—George F. Lesmes
*Assistant Examiner*—E. Rollins Buffalow
*Attorney, Agent, or Firm*—Richard P. Fennelly

[57] ABSTRACT

A substantially dimensionally stable, calendered vinyl film construction having good chemical resistance and outdoor durability is disclosed. The film comprises a calendered vinyl film, an adhesive having high creep and shrinkage resistance on one side thereof, and release paper bonded to the adhesive on the side remote from the vinyl film. It is useful as a substrate for markings and decals on the exterior surfaces of vehicles and other structures. The calendered film which comprises polyvinyl chloride, a plasticizer or plasticizers and heat and ultraviolet light stabilizers is heat and pressure stabilized after calendering. Release paper is then coated with a layer of high creep and shrink resistant adhesive by reverse roll coating, and the release paper/adhesive composite is dried and is laminated to the film at a laminating nip.

6 Claims, No Drawings

DIMENSIONALLY STABLE, CALENDERED VINYL FILM

This is a continuation of application Ser. No. 796,275, filed May 12, 1977, now abandoned, which in turn is a division of Ser. No. 667,223, filed Mar. 15, 1976, now U.S. Pat. No. 4,124,431.

BACKGROUND OF THE INVENTION

1. Field of the Invention

The present invention pertains to a substantially dimensionally stable, calendered vinyl film, which has good chemical resistance and outdoor durability, and which is useful as a marking film or decal substrate on the exterior surfaces of vehicles, such as railroad cars, automobiles, trucks, and the like, and other objects where outdoor marking is desirable, such as on gasoline pumps, railroad and highway signs, and the like.

2. Description of the Prior Art

Vinyl films formed by a film casting technique have been used as outdoor marking films. In film casting the plastic raw materials are first dissolved in a suitable solvent or solvents, after which the liquid material is spread out over polished drums or smooth belts which continuously convey the formed film through suitable curing chambers where the solvents are evaporated and recovered. Such products, however, have a number of drawbacks. They are expensive to make and can be ripped or torn if the person applying them to the desired object is not careful because of their generally low tear strength. Commercial cast films currently on the market are also rather thin having a thickness of about 2 mils which render their application to a desired article rather difficult.

Calendered films, although possessing many advantages, are not dimensionally stable. Thus, if one desires to print a multi-colored decal design on said films by means of a plurality of monochromatic printing steps, the film will shrink after each printing operation so that the various colors in the design will not be in proper registry when the printing operation is completed.

SUMMARY OF THE INVENTION

The present invention is a substantially dimensionally stable calendered, rather than cast, vinyl film which is suitable for use as an exterior marking film. Such a film is less expensive to make than conventional cast vinyl films, it has a greater degree of abrasion resistance than such films and will not tear, rip or scratch as easily, and it has excellent dimensional stability and will not shrink to any substantial degree during printing operations. The vinyl film of the present invention is formed using conventional calendering procedures, and is then stabilized against any later substantial shrinkage when in the final product by the application of heat and pressure. Suitable release paper is coated with a thin layer of an adhesive having high creep and shrink resistance and the release paper/adhesive composite is dried. The final step in making the film comprises the lamination of the release paper/adhesive composite to the film at a lamination nip while the film and composite are under minimum tension.

DESCRIPTION OF PREFERRED EMBODIMENTS OF THE INVENTION

The first step in forming the vinyl film construction of the present invention is the formation of a film forming composition which can be calendered and which has good chemical resistance and outdoor durability. If desired, the film can be pigmented. One such film-forming composition, which is itself a commercial product, comprises as major ingredients polyvinyl chloride homopolymer resin, the requisite amount of plasticizer to solvate the resin without adversely affecting the adhesion characteristics of the final product, and heat and ultraviolet light stabilizers to give the product the needed resistance to deterioration upon exposure to the outdoor elements. An especially preferred formulation comprises from about 50% to about 72%, by weight, polyvinyl chloride homopolymer resin, from about 5% to about 7%, by weight, of an acrylic polymer resin processing aid, from about 14% to about 20%, by weight, plasticizer, from about 3.5% to about 5.4%, by weight, of barium-cadmium and/or barium-cadmium-zinc heat stabilizer, and about 1.4%, by weight, or less of at least one ultraviolet light absorber or lubricant. If desired, the requisite amount of pigment can be added to give the desired color. From about 3% to about 25%, by weight, of the formulation may comprise pigments such as carbon black (at 3%, by weight, for a black film) and titanium dioxide (at 25%, by weight, for a white film). The plasticizer to resin (PVC plus processing aid) ratio for the film should be about 0.25 on a weight basis. A lower ratio will render the film forming composition more difficult to process whereas a higher ratio will begin to adversely affect the adhesion properties of the final product. This film formulation is then calendered at a temperature and pressure which allows formation of a film having a thickness of about 3 mils. A calendering temperature of about 350° F. is recommended. This calendered film although possessing good chemical resistance and outdoor durability will not, however, have the dimensional stability required in the final product of the present invention and must be heat and pressure stabilized. For example, after being heated to a temperature of about 100° C. for about 20 minutes, variations in size of up to about 7% in the direction in which the film passes through the calender (machine direction) and up to about 2% in the direction perpendicular to the machine direction (cross direction) do occur.

In order to stabilize the above described film against variations in size due to such later operations as multipass printings, it is essential that the calendered film be stabilized by the application of heat and pressure. This stabilization can be performed on what is known in the art as an embossing machine. Such a machine comprises a heated drum and series of heated rollers which bring the surface of the film in contact with them, an embossing nip at a relatively lower temperature than the drum and rollers and cooled idler rollers. The preferred procedure is to pass the film over a heated drum and two heated rollers such that the respective opposed sides of the film are sequentially in contact with the respective drum and rollers. The time of contact, and hence heating by the drum and rollers, is progressively shorter for each successive drum or roller. The total heating procedure takes from about 5 seconds to about 10 seconds. The first drum is heated to a temperature of about 220° F. to about 250° F. with the second and third rollers, which are coated with Teflon ® fluorocarbon, being heated at from about 265° F. to 285° F. The film is then fed through a polished embossing nip having rolls at a temperature of from about 40° F. to about 60° F. and a nip pressure of about 130 psi to about 160 psi. The opposed sides of the film are then sequentially fed over a series of cooled idler rollers at about 40° F. to about 60° F. and the film is rolled up onto a takeup roll. The maximum width loss of the film at this point is about 0.43%.

After the film has been heat and pressure stabilized the next step in forming the product of this invention is to coat a suitable release paper with an adhesive having both high creep and shrink resistance.

A preferred adhesive is an acrylic resin multipolymer solution having such properties. By "high shrinkage resistance" is meant a shrinkage of less than about 0.4%, preferably less than about 0.05%, when the adhesive is coated on a 20 cm. × 2.54 cm. plasticized vinyl sheet, is mounted on an aluminum panel for two hours, and is heated for 30 minutes at 250° F. The term "high creep resistance" means a time in excess of about 1000 min., preferably in excess of about 1250 min., for a 0.5 in$^2$ Mylar ® coated article to fall from a stainless steel bar after being bonded to such a bar for 10 minutes, followed by application of a 2 lb. weight to the film. A preferred adhesive for use in making the product of the present invention is available from Monsanto Polymers & Petrochemicals Co. under the name Gelva ® Multipolymer Solution RA-1753 and has a minimum solids content of 31% in a 55/35/10 ethyl acetate/isopropanol/hexane solvent. The solution viscosity of such a preferred adhesive ranges from about 3000 to 6000 cps.

Any conventional release paper can be used in the product of the present invention. Preferred for use is a 90 weight bleached kraft, polyethylene coated release paper having a thickness of from about 6.1 to about 6.7 mils, preferably 6.4–6.5 mils.

The adhesive is coated onto release paper by reverse roll coating so as to produce an adhesive thickness, when dry, that ranges from about 1.0 to about 1.5 mils, preferbly 1.1–1.3 mils. For the most aesthetic adhesive layer, the adhesive solution should be applied under conditions which will produce a coating which is smooth and of uniform consistency. For the preferred adhesive described above, the application should be at a temperature of from about 75° F. to about 105° F., the viscosity of the solution should range from about 2400 to about 3400 cps. and the solids content should be from about 26% to about 32%. If the initial viscosity is above this range, the adhesive solution can be diluted by adding a suitable dilution agent in the requisite amount. A suitable diluted adhesive solution comprises about 87.0% to about 90% of the adhesive, about 5% to about 6.5% of ethyl acetate, and about 5% to about 6.5% is isopropyl alcohol. The diluted solution is preferably allowed to stand for about 4 hours after said dilution before it is applied by means of conventional reverse roller coating techniques. In order to assure a smooth adhesive coating the coating head should wipe the application roll clean over its entire width. The adhesive and release paper composite is then prefereably subjected to a two-zone drying procedure wherein the first drying is at a temperature of about 130° F. to about 150° F. for about 30 to about 60 seconds, and the second is at a temperature of from about 260° F. to about 285° F. for about 30 to about 60 seconds. The former first drying zone flashes off most of the solvents contained in the adhesive layer, whereas the second dries the residual solvents and cures the polymer.

The adhesive/release paper composite is then laminated to the dull side of the vinyl film at a temperature of about 50° F.–70° F., preferably about 60° F. and a rubber backup roll at a temperature of about 50° F. to about 70° F., preferably about 60° F. The tension on the film and adhesive/release paper components is kept at a minimum during this lamination procedure.

The final product can then be printed with any desired pattern, in either a single pass or in multiple passes without deleterious shrinkage of the film occurring.

The final product, before printing, has the typical physical properties described below:

| Property | Value |
| --- | --- |
| Thickness | 4–5 mils |
| Tensile Strength (min.) | 2000 psi |
| % Elongation at Break | 100–300% |
| Adhesion* | 64 oz./in. |
| Shrinkage (unmounted)** | 1/32", max. |

*after 24 hrs. dry mounted to painted steel.
**measured from edge of release liner. The value represents the maximum shrinkage in either the machine or cross direction for a film approximately 10" × 10". It represents a maximum shrinkage of about 0.3%. The term "substantially dimensionally stable" as used herein should be construed as representing such a degree of maximum shrinkage or less.

The final product has good screen printability and shows no film degration, blistering or loss of adhesion after: (1) immersion in water at 90° F. for 240 hours; (2) exposure to salt spray for 250 hours; or (3) immersion for 1 hour in a solution of 85% mineral spirits and 15% xylol. Exposure in either a Weather-ometer ® or Fadeometer ® accelerated aging apparatus (available from Atlas Electric Devices Co.) for 2000 hours or exposure in South Florida (at an angle of 5° to the horizontal) for up to 24 months resulted in a minimum degree of fading, chalking, dulling or color change. There was no cracking, crazing, lifting or blistering of the mounted film and no loss of adhesion.

Preferred embodiments of the present invention are further illustrated in the Examples which follow:

EXAMPLES 1–2

These Examples illustrate the formation of white and black pigmented dimensionally stable, calendered vinyl film constructions according to the present invention.

The following ingredients were used to make the white and black vinyl films used in the construction:

| Ingredient | (% by weight) White | Black |
| --- | --- | --- |
| Medium molecular wt. PVC homopolymer resin[1] | 25.1 | 34.0 |
| High molecular wt. PVC homopolymer resin[2] | 25.1 | 34.0 |
| Acrylic Polymer resin[3] | 5 | 5 |
| 2-ethylhexyl phthalate plasticizer | 5 | 7 |
| Diisodecyl phthalate plasticizer | 5 | 7 |
| Epoxy ester plasticizer[4] | 4 | 4 |
| Barium-Cadmium Liquid Stabilizer[5] | 3 | 3 |
| Barium-Cadmium-Zinc Liquid Stabilizer[6] | 0.75 | 0.75 |
| Colloidal silica drying agent[7] | 0.25 | 0.25 |
| UV absorber[8] | 1.0 | 1.0 |
| TiO$_2$ pigment | 25 | — |
| Carbon black pigment | — | 3 |
| Barium-Cadmium-Zinc Powder Stabilizer[9] | 0.2 | 0.2 |

| Ingredient | (% by weight) White | Black |
|---|---|---|
| Stearic Acid | 0.5 | 0.5 |

Footnotes:
[1] available as SCC-676 from Stauffer Chemical Company. It has a relative viscosity of about 2.25 when measured as a 1%, by weight, solution in cyclohexanone at 25° C.
[2] available as SCC-686 from Stauffer Chemical Company. It has a relative viscosity of about 2.45 when measured as a 1%, by weight, solution in cyclohexanone at 25° C.
[3] a processing aid, available as K-120 from Rohm & Haas Co.
[4] available as Monoplex S-75 from Rohm & Haas Co.
[5] available as Mark Q 180 from Argus Chemical Corp.
[6] available as Synpron 367 from Dart Industries, Inc., Chemical Group.
[7] available as Cab-O-Sil from Cabot Corporation.
[8] a benzophenone compound, available as Cyasorb-531 from American Cyanamid Co., Organic Chemicals Div.
[9] available as Nuo Stabe V-1207 from Tenneco Chemicals, Inc., Organics & Polymers Division.

All dry materials, e.g., the resins, processing aid, solid stabilizers and pigments, were blended in a ribbon blender for about 5–10 minutes. After this blending step the liquid materials, e.g., the plasticizers, and liquid stabilizers, were added, and the resulting mixture was mixed at 200° F. for about ½ hour until the resin ingredients were solvated. The mixture was then brought to 300° F. to flux the mixture. The plasticized mass was then fed through a strainer to remove any foreign material and was calendered at a temperature of about 350° F. to form a vinyl film having a thickness of about 3 mils.

The calendered vinyl films described above were then heat stabilized by heat treatment in an embossing machine. One side of the film was drawn over a heated drum which was held at a temperature of about 230° F., the opposite side was drawn over an 8" heated roller at about 275° F., and the first side was then drawn over a 4" heated roller at 275° F. After being treated as described above the film was passed through an embossing nip where the rolls were at a temperature of about 50° C. under a pressure of about 150 psi. Thereafter the respective opposite sides of the film were sequentially placed in contact with three idler rolls at a temperature of about 50° F., and the film was then rolled up onto a takeup roll.

The adhesive and release paper were then laminated to the film. The acrylic multipolymer adhesive (Gelva ® Multipolymer Solution RA-1753 available from Monsanto Polymers & Petrochemicals Co.) at a viscosity of between about 2400–3400 cps. and a temperature of about 75°–105° F. was coated onto 90 lb. bleached kraft release paper by reverse roller coating. The adhesive/release paper composite was then subjected to a two stage drying procedure wherein the first drying temperature was 140° F. and the second was 280° F. After drying, the composite was then laminated to the dull side of the vinyl film at a cooled lamination nip comprising juxtaposed chrome and rubber rolls, each at a temperature of about 50° F. The tension on the film and adhesive/release paper composite was kept to a minimum during this lamination step.

The foregoing Examples are provided to illustrate certain preferred embodiments of the claimed invention. The scope of protection that is desired is set forth in the claims which follow.

What is claimed is:

1. A substantially dimensionally stable, calendered vinyl film construction, having a maximum shrinkage of about 0.3%, suitable for use as an outdoor marking film which comprises:
   (a) a calendered plasticized vinyl film containing from about 50% to about 72%, by weight, vinyl chloride resin;
   (b) a layer of an acrylic adhesive having a high creep resistance of in excess of about 1000 minutes and a high shrinkage resistance of less than about 0.4% on one surface of said vinyl film; and
   (c) release paper attached to the adhesive on the side remote from the vinyl film.

2. A construction as claimed in claim 1 wherein the vinyl film comprises from about 50% to about 72%, by weight, polyvinyl chloride resin and from about 14% to about 20%, by weight, of plasticizer, said weight ratio of plasticizer to resin being about 0.25.

3. A construction as claimed in claim 1 wherein the vinyl has a thickness of about 3 mils.

4. A construction as claimed in claim 1 wherein the adhesive layer has a thickness of from about 1.0 to about 1.5 mils.

5. A construction as claimed in claim 1 wherein the release paper has a thickness of from about 6.1 to about 6.7 mils.

6. A construction as claimed in claim 2 which further comprises from about 3.5% to about 5.4%, by weight, of at least one heat stabilizer, and about 1.4%, by weight or less of at least one ultraviolet light absorber or lubricant.

* * * * *

UNITED STATES PATENT AND TRADEMARK OFFICE
CERTIFICATE OF CORRECTION

PATENT NO. : 4,223,054
DATED : September 16, 1980
INVENTOR(S) : Kurt M. Schramer et al.

It is certified that error appears in the above-identified patent and that said Letters Patent are hereby corrected as shown below:

Col. 3, line 51, "is" should be -- of --;

Col. 4, line 26, "degration" should be -- degradation --; and

Col. 5, footnote 6, "Synpron 367" should be -- Synpron 387 --.

Signed and Sealed this

Sixteenth Day of December 1980

[SEAL]

Attest:

SIDNEY A. DIAMOND

Attesting Officer     Commissioner of Patents and Trademarks